S. KAYE.
PACKING JOINT FOR BOTTLE NECKS.
APPLICATION FILED JULY 2, 1914. RENEWED JUNE 13, 1919.
1,367,663.
Patented Feb. 8, 1921.
3 SHEETS—SHEET 1.
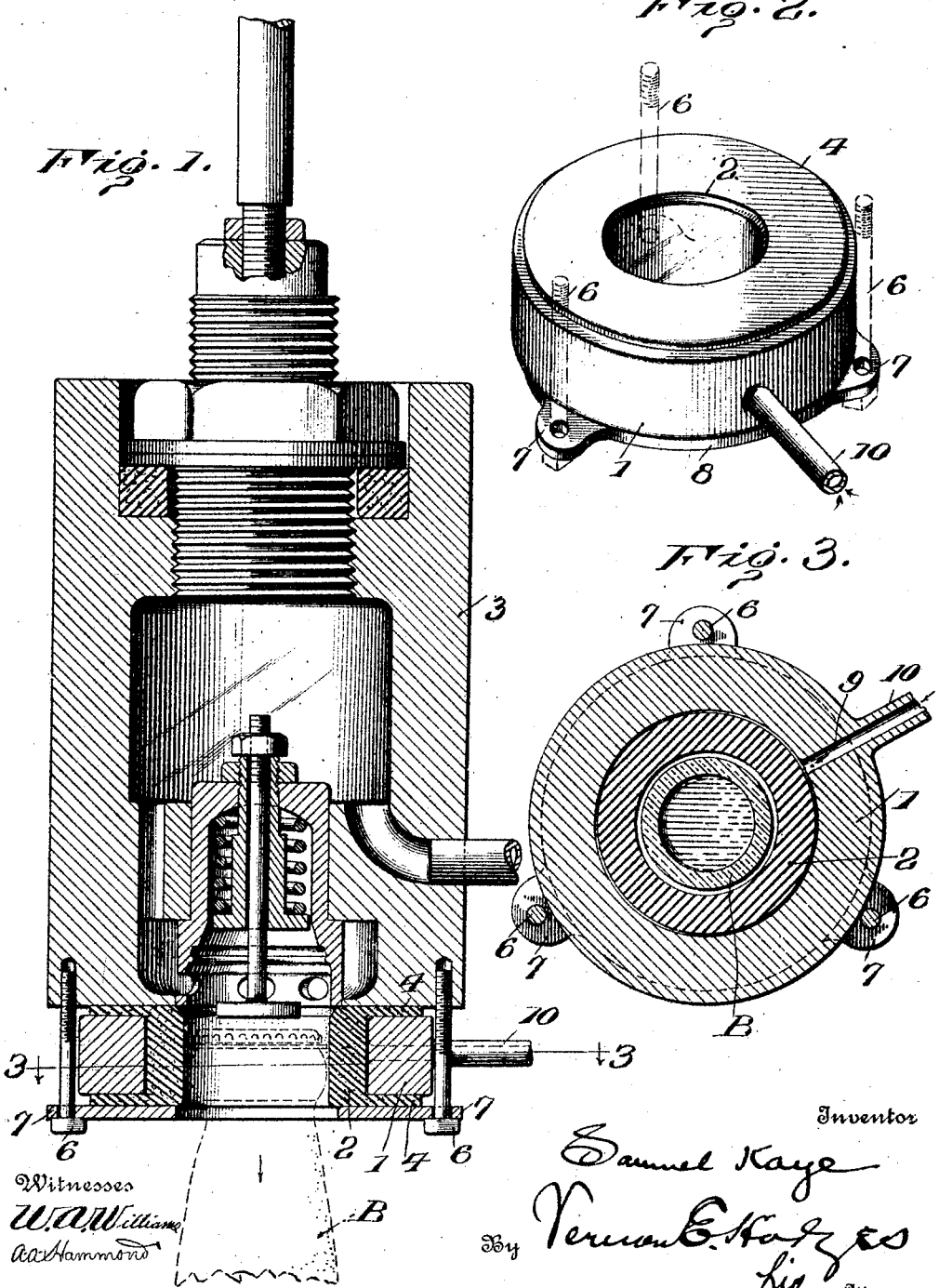

S. KAYE.
PACKING JOINT FOR BOTTLE NECKS.
APPLICATION FILED JULY 2, 1914. RENEWED JUNE 13, 1919.
1,367,663.
Patented Feb. 8, 1921.
3 SHEETS—SHEET 2.
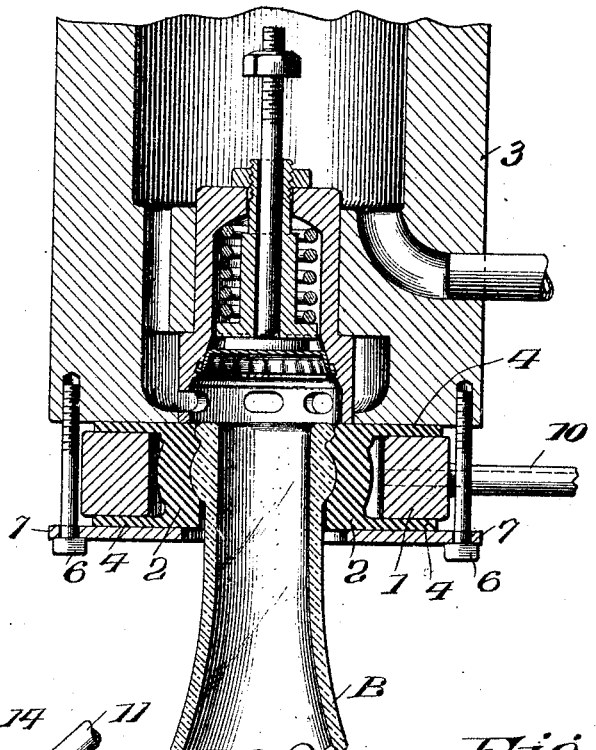
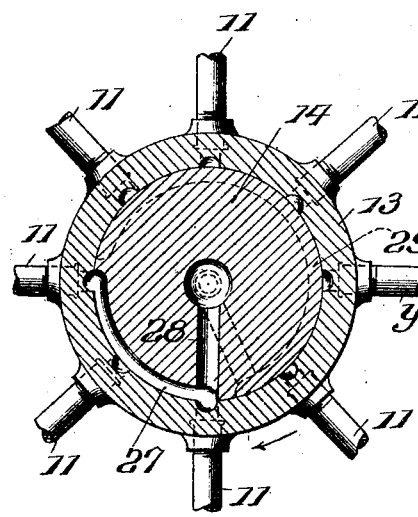
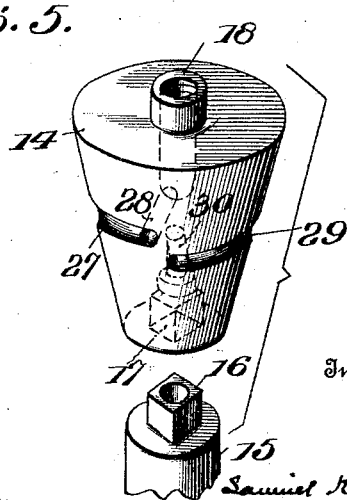

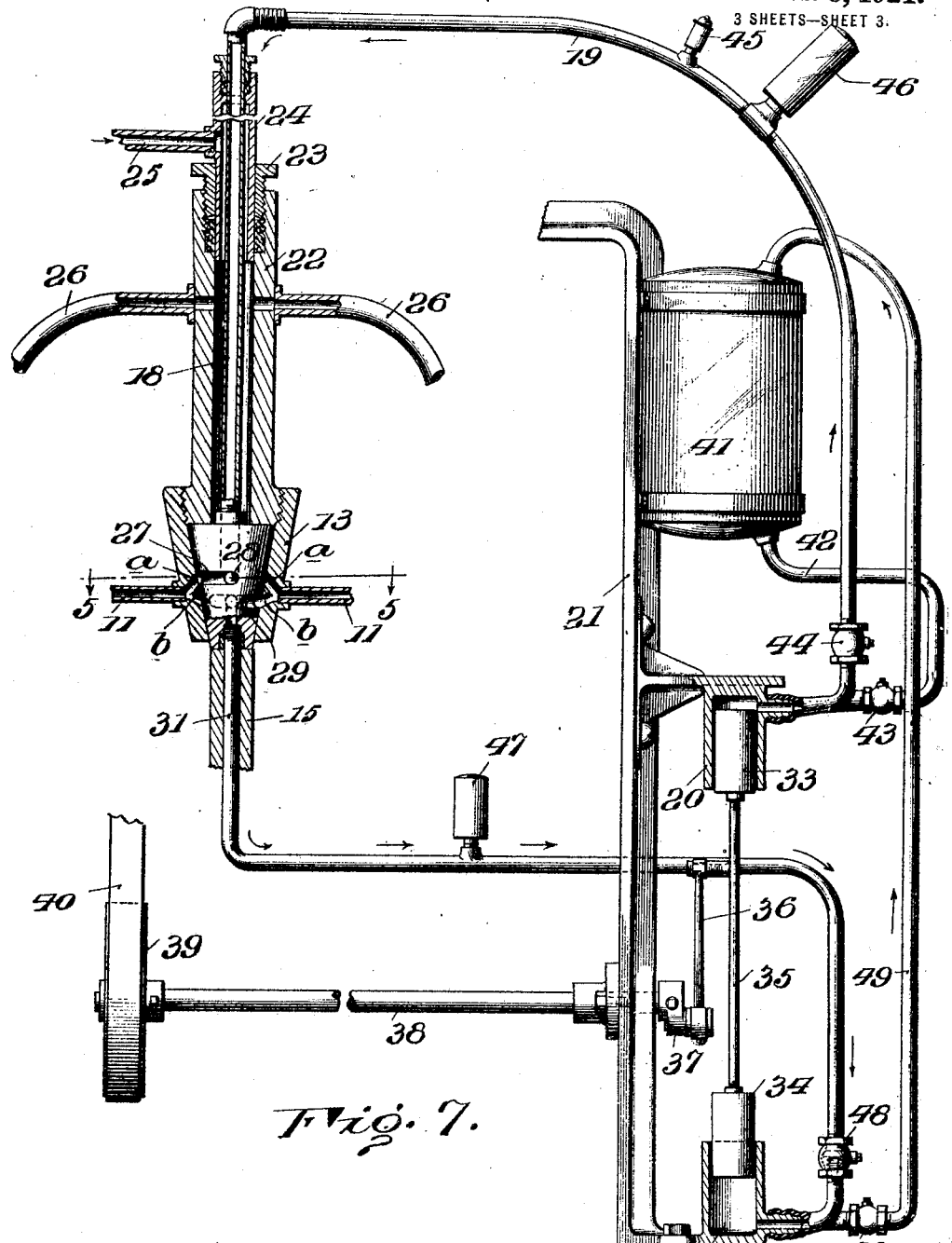

UNITED STATES PATENT OFFICE.

SAMUEL KAYE, OF COLUMBUS, MISSISSIPPI.

PACKING-JOINT FOR BOTTLE-NECKS.

1,367,663.     Specification of Letters Patent.     Patented Feb. 8, 1921.

Application filed July 2, 1914, Serial No. 848,634. Renewed June 13, 1919. Serial No. 304,083.

*To all whom it may concern:*

Be it known that I, SAMUEL KAYE, a citizen of the United States, residing at Columbus, in the county of Lowndes and State of Mississippi, have invented certain new and useful Improvements in Packing-Joints for Bottle-Necks, of which the following is a specification.

My invention relates to an improvement in bottling machines, and the object is to provide an air and water-tight joint around the neck of the bottle being filled to prevent the leakage and loss of liquid to be placed in the bottle; and the present invention is a packing-joint which is operated preferably by hydraulic pressure to form this air and water-tight joint.

In the accompanying drawings:—

Figure 1 is a sectional view through a filling head showing the bottle-neck in dotted lines in position just after the bottle-cap has been placed thereon;

Fig. 2 is a view in perspective of the packing and the metallic ring with which it coöperates;

Fig. 3 is a horizontal section through the same;

Fig. 4 is a sectional view showing the bottle-neck clamped by the packing;

Fig. 5 is a sectional view of the valve which controls the pressure and suction;

Fig. 6 is a perspective view of the latter; and

Fig. 7 is a general diagrammatic view showing a form of pressure and suction system employed in the operation of the packing.

The numeral 1 is a metallic ring, and 2 is the packing which clamps the bottle-neck B in the mouth of the filling-head 3. This packing-ring 2 is made of elastic material, such as rubber, and is provided with the integral flanges 4, 4, which fit and embrace the upper and lower edges of the metallic ring 1. The metallic ring 1 and the flanges 4, 4, of the rubber packing 2 are clamped securely to the lower end of the filling-head 3 by means of screws 6, 6, which extend through the ears 7, 7, in the plate 8.

An orifice 9 extends through the metallic ring 1, and a nipple 10 extending out therefrom is adapted to receive one end of a rubber hose 11, whereby the water which creates the pressure back of the packing-ring 2 is conducted to the space between the metallic ring 1 and the packing 2.

There are as many of these rubber hose, of course, as there are filling-heads in a machine. In the one illustrated, I have provided for eight, as shown in Fig. 5, the other ends of the rubber hose connecting with the valve-casing 13, as shown in Figs. 5 and 7.

This valve-casing is fitted to a tapering valve 14 (shown in Fig. 6), which is held from revolving by the hollow post 15, the upper end of which is squared as at 16 to fit the correspondingly-shaped socket 17 in the lower end of the valve 14. A pressure-pipe 18 extends into the upper end of this valve, said pipe being supplied with water through the pipe 19 leading from the pressure pump 20 secured to a bracket at some convenient point on the frame 21 of the machine.

From the valve-casing 13, a sleeve 22 extends upwardly and surrounds the pipe 18, at the upper end of which there is a packing-gland 23, which forms a swivel around the lower end of the stationary charging-pipe 24 into which the gas and water are conducted by means of a pipe 25 which fills the bottles through the several lateral branch pipes 26, 26.

Coming now to the construction of the valve 14, a circumferential groove 27 is formed horizontally part way around the surface of the valve in position to supply one or more of the hose or pipes 11, 11, (as shown in Fig. 5) and a duct 28 leads from the terminus of the pressure-pipe 18 in the valve 14 to one end of said groove for supplying said groove.

A similar groove 29 is formed at a lower level than the circumferential groove 27. on the valve 14 to create suction in one or more of the pipes or hose 11, 11, (as shown in Figs. 5 and 6) a duct 30 extending radially from one end of this groove 29 to a point at the center of the valve to communicate with the pipe 31 leading downwardly from the valve through the hollow post 15, and thence to the suction pump 32 (as shown in Fig. 7).

The pressure and suction pumps 20 and 32 respectively are provided with pistons 33 and 34 respectively, which are connected in the construction illustrated in Fig. 7 by a rod 35; and a connecting rod 36 extends to this rod 35 and to a crank 37 on the drive-shaft 38 on the outer end of which is a pulley 39 over which the belt 40 runs.

A water supply tank 41 is stationed at some convenient point on the machine, as illustrated, and a pipe 42 leads from the lower end of this water supply into the pressure cylinder 20, there being a check-valve 43 therein to prevent back pressure. The pipe 19, previously referred to, extends from the pressure pump and connects with the upper end of the pipe 18, and a check-valve 44 in this pipe prevents back flow. The pressure valve 45 prevents excess of pressure, and an air chamber 46 on this pipe affords a cushion for the excess air pressure.

A suction pipe 31 has a similar air-chamber 47, and a check-valve 48 therein prevents back flow in said pipe 31. A pipe 49 leads from the suction cylinder 32 to the upper end of the water supply tank 41, and a check valve 50 in this pipe prevents return flow to the cylinder 32.

In operation, the pump 20 sucks water from the supply 41 through pipe 42, and forces it out through the pipe 19 into the valve 14, whence it is distributed through several hose or pipes 11, 11, to the various filling-heads 3, 3, entering the space between the rings 1 and the packings 2, thus causing the latter to form tight-joints around the bottle-necks (as illustrated in Fig. 4). This continues while the bottles are being filled, at the conclusion of which the casing 13 has turned sufficiently far to shut off the water supply through the duct 28 and groove 27 of the upper branch port *a* in the valve-casing 13, and to bring the duct 30 with the groove 29 into registry with one or more of the rubber hose or pipes 11, 11, and the lower branch port *b* in the valve-casing 13, whereupon, through the suction created by the suction pump 32 and in the pipe 31, the water is withdrawn from the space between the rings 1 and the packings 2 into the cylinder 32 of the suction-pump with the outstroke of the piston 34, after which it is forced out through the pipe 49 back to the water supply 41, whence it is again withdrawn by the suction of the pressure pump 20, and used again in the various filling-heads. This operation repeats itself as often as bottles are to be clamped and filled during the entire operation of the machine.

By this means the loss of the liquid to be bottled, which heretofore has been considerable, is reduced almost to nothing, thus greatly economizing in the handling and bottling of the material.

I claim:

1. The combination with an air and water-tight packing-joint for bottle-necks, constructed and adapted to be controlled by fluid pressure, of a continuously rotary valve casing and means extending therefrom to the joint, whereby pressure and suction are alternately and automatically created in the joint.

2. The combination with a plurality of air and water-tight packing-joints for bottle-necks, constructed and adapted to be controlled by fluid pressure, of a single continuously rotary valve casing common to and in communication with all of said joints, and means for alternately creating pressure and suction successively at said joints.

3. The combination with hard and elastic rings one within the other with an intervening space between, of pipes leading to said space, of a stationary valve having grooves, a rotary valve-casing in which said valve is seated, said casing having openings, a pressure pipe leading to one end of the valve, and a suction pipe to the other, means leading from openings in the casing to said first-mentioned pipes, the whole so arranged as to alternately tighten and loosen said elastic rings as the valve-casing rotates.

4. The combination with a hard and an elastic ring, a pipe leading to the space between said rings, of a valve, and valve-casing to which latter the pipe leads, pipes leading to the valve, ducts leading from said pipes to grooves on the surface of the valve, and branch-ports in the casing leading to said pipes, which alternately register with the grooves of the valve, and means for creating fluid pressure and suction through said pipes.

5. The combination with a hard and an elastic ring and a pipe leading to the space between the two rings, of a valve, and valve casing to which latter the pipe leads, the valve having peripheral grooves, suction and pressure pipes leading to the valve, ducts leading from the said pipes to the grooves, and branch-ports in the casing leading to said pipes which alternately register with the grooves of the valve, and means for creating fluid pressure and suction through said pipes.

6. The combination with a plurality of rings in pairs, one at least of each pair being elastic, and pipes leading to the spaces between said rings, of a rotary casing to which said pipes lead, said casing having branch ports therein in communication with said pipes, of a valve fitting to the casing, pressure and suction pipes leading to the valve, circumferential grooves in the valve, ports leading to said grooves from the pressure and suction pipes, the circumferential grooves of the valve registering alternately with the branch ports in the casing, and suction and pressure means connected with the suction and pressure pipes.

In testimony whereof I affix my signature, in the presence of two witnesses.

SAMUEL KAYE.

Witnesses:
BATTLE BELL,
BEVERLY MATTHEWS.